United States Patent [19]

Smith et al.

[11] 4,105,551

[45] Aug. 8, 1978

[54] TREATMENT OF AQUEOUS SYSTEMS

[75] Inventors: Malcolm John Smith, Rose Hill; Peter Miles, Bramhall; Norman Richardson, Middleton; Michael Anthony Finan, Macclesfield, all of England

[73] Assignee: Ciba Geigy (UK) Limited, London, England

[21] Appl. No.: 755,604

[22] Filed: Dec. 29, 1976

Related U.S. Application Data

[62] Division of Ser. No. 582,402, May 29, 1975, Pat. No. 4,046,707.

[30] Foreign Application Priority Data

Jun. 11, 1974 [GB] United Kingdom ............... 25853/74

[51] Int. Cl.² .................................................. C02B 5/06
[52] U.S. Cl. ...................................... 210/58; 252/180; 252/181; 260/502.4 R; 526/27
[58] Field of Search ....................... 21/2.7 A; 204/159; 210/54, 58; 252/175, 180, 181, 389 A; 260/403, 502.4 R; 526/14, 27

[56] References Cited

U.S. PATENT DOCUMENTS

| | | |
|---|---|---|
| 2,957,931 | 10/1960 | Hamilton et al. ...................... 252/89 |
| 3,159,537 | 12/1964 | Takesue et al. .................... 260/502.5 |
| 3,684,779 | 8/1972 | Rapko ..................................... 210/58 |
| 3,686,145 | 8/1972 | Haschke et al. ...................... 252/180 |
| 4,042,324 | 8/1977 | Auel et al. .............................. 210/58 |

FOREIGN PATENT DOCUMENTS 2,274,565  6/1974  France ..................................... 252/180

*Primary Examiner*—Thomas G. Wyse
*Assistant Examiner*—Peter A. Hruskoci
*Attorney, Agent, or Firm*—Wenderoth, Lind & Ponack

[57] ABSTRACT

A method of inhibiting the precipitation of the scale forming salts of calcium, magnesium, barium and strontium from aqueous systems comprising adding to the aqueous system a minor proportion of a product comprising a telomeric compound of the formula:

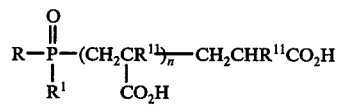

or salts thereof, wherein $R^{11}$ is hydrogen or a methyl or ethyl residue and $n$ is a positive integer of at most 100, R is a residue —OX wherein X is a straight or branched alkyl residue having from 1 to 4 carbon atoms, and $R^1$ is a residue —OX wherein X has its previous significance.

6 Claims, No Drawings

TREATMENT OF AQUEOUS SYSTEMS

This is a division of application Ser. No. 582,402, filed May 29, 1975 now U.S. Pat. No. 4,046,707.

CROSS-REFERENCE TO RELATED APPLICATION

The present invention relates to the treatment of aqueous systems.

The majority of natural waters, and aqueous systems in general, contain dissolved salts of metals such as calcium, magnesium, barium and strontium. When the water or aqueous system is subjected to heating, the dissolved salts may be converted to insoluble salts and deposited as scale on heat transfer surfaces in contact with the water or aqueous system. If the water or aqueous system is concentrated even without heating, insoluble salts may also be precipitated.

Salt precipitation and scale deposition are troublesome and can cause increased costs in maintaining aqueous systems in good working order. Among the problems caused by scale deposits are obstruction of fluid flow, impedance of heat transfer, wear of metal parts, shortening of equipment life, localised corrosion attack, poor corrosion inhibitor performance, and unscheduled equipment shutdown. These problems can arise in water or oil wells, water pipes, steam power plants, water desalination plants, reverse osmosis equipment utilising aqueous solutions, heat exchange equipment, and equipment concerned with the transport of products and by-products in aqueous media (e.g. fly ash formed during the combustion of coal in the production of electricity). The range of temperature over which these processes operate is wide, for example ambient temperatures are used for cooling water and elevated temperatures are used for steam power plants.

DESCRIPTION OF THE PRIOR ART

One method used to overcome the disadvantages associated with scale formation has involved the dismantling of equipment to enable the accumulated deposits to be cleaned out. This procedure is costly and does not prevent scale redeposition. Another method involves the use of strong alkali solution for the removal of, in particular, sulphate scale. It has been alleged that under suitable conditions of temperature and time the alkali treatment eventually provides an initial break up of the scale, which can then be removed by mechanical means. Such a method requires considerable time, and the removal of scale subsequent to treatment is often difficult.

There is therefore a need in this field for a composition which can be added to water or aqueous systems in very small quantities and which can cut down the rate at which insoluble salts are precipitated over a wide temperature range. Furthermore when any scale is formed, it should desirably be easily removable from surface by mechanical means.

A number of additives have been proposed for addition to water or aqueous systems for these purposes, among them certain polyphosphates, polycarboxylic acids, such as polymerised acrylic acid and polymerised methacrylic acid.

The polyphosphates ultimately give a soft friable scale which is easily removed from surfaces, whereas the use of polycarboxylic acid results in a hard adherent eggshell-like scale.

Where water-treatment processes involving heat are used, the temperatures are increasing, and since polyphosphate additives are readily hydrolysed at high temperatures and as a result can give rise to the precipitation of insoluble calcium orthophosphate, their usefulness is consequently limited.

DESCRIPTION OF THE PREFERRED EMBODIMENTS

According to the present invention, there is provided a method of inhibiting the precipitation of the scale forming salts of calcium, magnesium, barium and strontium from aqueous system over a wide temperature range, comprising adding to the aqueous system a minor proportion of a product comprising a telomeric compound of the formula:

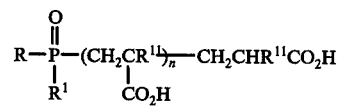

and salts thereof, wherein R" is hydrogen or a methyl or ethyl residue, $n$ is a positive integer of at most 100 R is hydrogen, a straight- or branched alkyl residue, having from 1 to 18 carbon atoms, a cycloalkyl residue having from 5 to 12 carbon atoms, an aryl residue, an aralkyl residue, a residue of formula:

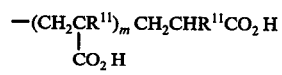

wherein R" has its previous significance and the sum $n + m$ is an integer of at the most 100, or a residue —OX wherein X is hydrogen or a straight- or branched alkyl residue having from 1 to 4 carbon atoms and R' is a residue -OX wherein X has its previous significance.

Salts of the telomeric compounds of formula I are compounds in which some or all of the acidic hydrogens in the acidic compounds of formula I have been replaced by alkyli metal ions, ammonium ions or quaternised amine radicals. These salts also have good activity in inhibiting the precipitation of insoluble salts from aqueous solution, The compounds of formula 1, reaction products containing compounds of formula I and salts thereof are effective in inhibiting the deposition of scale and precipitation of salts from aqueous solutions. The scale forming salts are derived from calcium, magnesium, barium or strontium cations and anions such as sulphate, carbonate, hydroxide, phosphate or silicate. The compounds of formula I, reaction products containing compounds of formula I and salts thereof are particularly effective in inhibiting the deposition of calcium sulphate, magnesium hydroxide and calcium carbonate scales.

Preferably R" is hydrogen and it is preferred that the sum of $m$ and $n$ is an integer less than 60.

Examples of substituents R include hydrogen, a straight-or branched chain alkyl residue having from 1 to 10 carbon atoms, a cyclohexyl, a phenyl, or a benzyl residue, or a residue —OX wherein X has its previous significance.

Examples of the bases with which compounds of formula I may be reacted in order to form partial or complete salts are the hydroxides and carbonates of sodium, potassium and ammonia. Similarly organic bases may be employed. For instance primary, secondary and tertiary alkyl and substituted alkyl amines in which the total carbon number does not exceed twelve, such as triethanolamine.

The compounds of formula I are not new; the compounds and their process of manufacture are described in U.S. Pat. No. 2,957,931.

Thus the compounds of formula I may be prepared in a convenient manner by reacting various molar ratios of a compound of formula:

$$CH_2 = CR'' - CO_2H \qquad \text{II}$$

wherein R" has its previous significance, with a compound of formula:

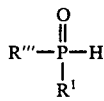    III wherein R' has its previous significance and R''' is hydrogen, a straight or branched chain alkyl residue having from 1 to 18 carbon atoms, a cycloalkyl residue having from 5 to 12 carbon atoms, a phenyl, a benzyl residue or OX wherein X has its previous significance.

Alternatively a salt of the compound of formula III may be employed in which the acidic hydrogens have been partially or completely replaced by cations derived from the salt forming bases hereinbefore described.

The reaction is carried out in a solvent inert under the reaction conditions and in the presence of a reaction initiator. Suitable reaction solvents are for instance, water, aqueous ethanol or dioxan. Suitable reaction initiators include materials which decompose under the reaction conditions to yield free radicals. Examples of such materials are bisazoisobutyronitrile, organic peroxides such as benzoyl peroxide, methyl ethyl ketone peroxide, ditertiary butyl peroxide and monobutyl hydroperoxide, and oxidising agents such as hydrogen peroxide, sodium perborate and sodium persulphate.

The products of this process are obtained as solutions. These may be subjected to partial or complete evaporation under reduced pressure. The unpurified reaction products may be used as the telomeric products in the method of the invention. The reaction products may also be purified. The purification procedure may be:
 (i) by evaporation of reaction solvent, dissolving the residue in water, washing with a water immiscible organic solvent e.g. ether and evaporation of the aqueous solution
 (ii) by evaporation of reaction, dissolving the residue in methanol and reprecipitation by addition of ether.

When the reaction products are employed without purification the ratio of reactants is important in that the activity of the product varies accordingly. For example the product derived from reacting 7 mole equivalents of acrylic acid and 1 mole equivalent of hypophosphorous acid has a greater activity in inhibiting for instance calcium sulphate precipitation compared to products derived from reacting acrylic acid and hypophosphorous acid in the molar ratios of 2:1; 14:1 and 28.1 respectively. Purification of the product derived from the reaction of 2 mole equivalents of acrylic acid and 1 mole equivalent of hypophosphorous acid by precipitation from its methanol solution by the addition of ether resulted in a product which exhibited good activity.

Salts of the compounds of formula I in which some or all of the acidic hydrogens in the compounds of formula I have been replaced by the cations derived from the salt forming bases hereinbefore defined, may be prepared by mixing an aqueous or alcoholic solution of the compound of formula I with an aqueous or alcoholic solution containing an amount of the requisite base in excess of, equal to or less than the stoichiometric requirement. The solvent may then be removed by evaporation. In many of the water-containing systems where inhibitors of this invention would prove useful, the water is sufficiently alkaline to effect neutralisation and only the product of the invention need be added.

The precise nature of the products of this preparative process is not entirely clear. Nuclear magnetic resonance examination has shown, however, that in addition to unreacted compound of formula III and polymerised compounds derived from formula II, the reaction product of the process hereinbefore described contains a compound of the formula I as hereinbefore defined.

The excellent activity of the compounds of formula I, and of reaction products containing compounds of formula I produced according to the process described hereinbefore, as inhibitors for the deposition of the salts as hereinbefore defined, from aqueous solutions was demonstrated by comparative testing against both commercial products, and polymerised acrylic acid produced by treating a compound of formula II R''=H, with a peroxide in the absence of a compound of formula III.

The amount of the inhibitor product comprising a compound of formula I to be used in the method according to the invention may be, for example, from 1 part per million up to 200 parts per million and may be for example from 2 to 20 parts per million. The minimum amount of inhibitor required depends upon the concentration of the salts in the water to be treated.

The inhibitor composition used according to the method of the invention may be incorporated into the aqueous system to be treated in conjunction with other compounds known to be useful in water treatment.

Dispersing and/or threshold agents may be used, such as for example polymerised acrylic acid and its salts, hydrolysed polyacrylonitrile, polymerised methacrylic acid and its salts, polyacrylamide and co-polymers thereof from acrylic and methacrylic acids, lignin sulphonic acid and its salts, tannin, naphthalene sulphonic acid/formaldehyde condensation products, starch and its derivatives, and cellulose. Specific threshold agents such as for example, hydrolysed polymaleic anhydride and its salts, alkyl phosphonic acids, 1-aminoalkyl, 1,1-diphosphonic acids and their salts and alkali metal phosphates, may also be used.

The inhibitor composition of the present invention may also be used in combination with precipitating agents such as alkali metal orthophosphates, carbonates and hydroxides, oxygen scavengers such as alkali metal sulphites and hydrazine, and sequestering agents such as nitrilotriacetic acid and their salts and ethylene diamine tetraacetic acid and its salts. They may also be used in conjunction with corrosion inhibitors such as cyclohexylamine, morpholine, distearylamine/ethylene oxide condensation products, stearylamine, and also in conjunction with antifoaming agents such as distearyl sebacamide, distearyl adipamide and related products derived from ethylene oxide condensations, in addition to fatty alcohols, such as capryl alcohols and their ethylene oxide condensates.

The following Examples further illustrate the present invention. Parts and percentages shown therein are by weight unless otherwise stated.

In examples A-D the reaction solvent was 1,4-dioxan and the reaction initiator benzoyl peroxide. Hypophosphorous acid was used throughout as a 50% aqueous solution and parts of hypophosphorous acid refers to parts of that 50% aqueous solution.

EXAMPLE A

Treatment of acrylic acid with hypophosphorous acid in a 2:1 molar proportion.

Acrylic acid ( 44 parts) and hypophosphorous acid ( 40 parts) were dissolved in dioxan ( 130 parts) by stirring. Benzoyl peroxide containing 25% water ( 2.5 parts) was added and the mixture heated at a reflux for 24 hours. The solution was then evaporated under reduced pressure, the final traces of water being removed at 100°/0.1 mm. The residue was dissolved in methanol ( 60 parts) and reprecipitated by the addition of ether. This precipitation procedure was repeated twice further to yield a viscous residue. Traces of solvent were removed by evaporation at 100°/0.1 mm to yield a white glassy solid.

The product had a mean molecular weight of approximately 600 (vapour pressure osmometry using methanol solution) and a phosphorous content of 5.2%. This indicated that it contained an average of about 7 moles of acrylic acid per mole of hypophosphorous acid.

The $^{31}P$ n.m.r. spectrum was obtained using Fourier Transform analysis. The spectrum contained ( inter alia) signals at the following chemical shifts using $H_3PO_4$ standard.

| Chemical Shift | Multiplicity | Assignment |
| --- | --- | --- |
| p.p.m. | | |
| + 4.1 | | |
| − 9.9 | Triplet | Hypophosphorous Acid |
| −24.1 | | |
| −15.7 | | |
| −39.5 | Doublet | Compound of formula I R = H R' = OH |
| −50.2 | Singlet | Compounds of formula I R = H R' = H |

EXAMPLE B

Treatment of acrylic acid with hypophosphorous acid in a 7:1 molar proportion

Acrylic acid ( 40 parts), hypophosphorous acid ( 10.5 parts) benzoyl peroxide containing 25% water ( 2.5 parts) and water ( 13 parts) were dissolved in dioxan ( 130 parts) by stirring. Heated at reflux for 24 hours, evaporated under reduced pressure, the final traces of solvent being removed at 100°/0.1mm. The product was obtained as a white glassy solid.

EXAMPLE C

Treatment of acrylic acid with hypophosphorous acid in a 14:1 molar proportion.

Example B was repeated using hypophosphorous acid (5.3 parts) and water ( 16 parts). The product was obtained as a white glassy solid.

COMPARATIVE EXAMPLE C

Treatment of acrylic acid with benzoyl peroxide in the absence of hypophosphorous acid.

Example B was repeated in the absence of hypophosphorous acid using water (18 parts). The product was obtained as a white glassy solid.

EXAMPLE D

Treatment of acrylic acid with hypophosphorous acid in a 7:1 molar proportion using water as solvent.

A suspension of hypophosphorous acid ( 262 parts), acrylic acid (100 parts), benzoyl peroxide containing 25% water ( 10 parts) and water (800 parts) was stirred and heated cautiously to 95°–98°. At this temperature an exothermic reaction occurred causing the system to reflux. External heating was removed. The system was maintained at reflux by gradual addition of acrylic acid (900 parts) over 45 minutes. After the addition was complete and the exothermic reaction had subsided the mixture was stirred at 95°–100° for 3 hours. After this period the mixture was allowed to cool. A sample was tested with acidified potassium iodide and starch solution in order to check that peroxide did not remain. The product was obtained as a viscous solution.

EXAMPLE E

A sample (50 parts) of the solution from Example D was evaporated under reduced pressure as in Example A. The dried product was obtained as a white glassy solid ( 27.5 parts).

EXAMPLE F

Treatment of acrylic acid with n-octyl phosphinic acid in a 5:1 molar proportion.

Acrylic acid ( 10 parts), n-octyl phosphinic acid ( 5 parts) and benzoyl peroxide containing 25% water (0.5 parts) were treated as in Example B. After evaporation of the reaction solvent the residue was dissolved in water and washed with ether. The ether phase was discarded. The aqueous phase was evaporated under reduced pressure the final traces of solvent being removed at 100°/0.1 mm. The product was obtained as a white glassy solid which had a phosphorus content of 0.7%. This indicated that it contained an average of about 60 moles of acrylic acid per mole of n-octyl phosphinic acid.

EXAMPLE G

Treatment of acrylic acid with diethylphosphite in a 1:2 molar proportion.

A solution of benzoyl peroxide ( 70% in dimethyl phthalate; 0.26 parts) in diethylphosphite ( 13.8 parts) was added to a solution of acrylic acid ( 18 parts) in diethyl phosphite ( 55.2 parts). The mixture was heated to 90° to initiate the exothermic reaction which caused the temperature to rise to 130°. The mixture was cooled to 90° and maintained at this temperature for 3 hours. The excess diethyl phosphite was removed by vacuum distillation and the residue dissolved in methanol. Telomer was obtained by precipitation in diethyl ether and dried under vacuum at 50° C. It had a phosphorus content of 1.11% which indicated that it contained an average of about 36 moles of acrylic acid per 1 mole of diethyl phosphite.

EXAMPLE H

Treatment of acrylic acid with orthophosphorous acid in a 7:1 molar proportion.

To a solution of 5.85g (1/14th mole) orthophosphorous acid and 3.6 g potassium persulphate in 100 g water at 75° C were added 36 g (½ mole) acrylic acid over a period of 30 minutes. The reaction mixture was heated to 85° C and maintained at this temperature for 3 hrs.

A sample of the telomer was isolated by evaporating the solution to dryness. The polymeric residue was dissolved in methanol and the solution filtered in order to remove traces of inorganic material. The telomer was reprecipitated by addition of the solution to an excess of diethyl ether. The telomer was found to have a phosphorus content of 1.43% which indicated that it contained an average of 29 moles of acrylic acid per 1 mole of orthophosphorous acid.

EXAMPLE I

Treatment of acrylic acid with orthophosphorous acid in a 2:1 molar proportion.

To a solution of 20.5g (¼ mole) orthophosphorous acid and 3.6 g potassium persulphate at 75° C were added 36g (½ mole) acrylic acid over a period of 30 minutes. The reaction mixture was heated to 85° C and maintained at this temperature for 3 hours.

A sample of the telomer was isolated by evaporating the solution to dryness. The polymeric residue was dissolved in methanol and the solution filtered to remove traces of inorganic material. The telomer was reprecipitated by addition of the solution to an excess of diethyl ether.

The telomer was found to have a phosphorus content of 3.47% which indicated that it contained an average of 11 moles acrylic acid per 1 mole orthophosphorous acid.

EXAMPLE J

Treatment of acrylic acid with phenylphosphinic acid in 7:1 molar proportion.

5.6g. of phenylphosphinic acid were dissolved in 50 mls. of dioxan and 20g. of redistilled acrylic acid were added, followed by 5 mls. of water and 1.5 g. of benzoyl peroxide. The reaction mixture was stirred under reflux conditions for 24 hours, then evaporated to dryness and dried under high vacuum over sodium hydroxide at 100° C. In this way, 23 g. of a white glassy solid were obtained.

EXAMPLE K

Treatment of acrylic acid with butyl hypophosphite in 7:1 molar proportion.

4.9 g. of butyl hypophosphite was dissolved in dioxan and 20g. of acrylic acid were added. 1.3g. of dry benzoyl peroxide were added and the whole was heated gently at 100° C. under an atmosphere of nitrogen. The reaction mixture was then evaporated to dryness and dried under high vacuum over sodium hydroxide at 100° C. to leave 21g. of a white glassy solid.

EXAMPLES 1 to 11

Aqueous solutions of $Ca(NO_3)_2.4H_2O$ (6.6% w/w; 100 ml) and $MgSO_4.7H_2O$ (6.9% w/w; 100 ml) were mixed to provide a ten fold supersaturated solution of $CaSO_4.2H_2O$. An amount of an aqueous solution containing 1000 p.p.m. of one of the products from Examples A-K was added in order to provide an additive concentration of 10 or 5 p.p.m. in the test solution. The solution was stirred and allowed to stand at room temperature. After 90 hours a sample of the test solution was withdrawn and the concentration of calcium ions remaining in solution was determined by titration with E.D.T.A. The test data were recorded by expressing the calcium ion concentration present in solution at 90 hours as a percentage of the calcium ion concentration present in solution at the start of the test. The test data are recorded in Table I which also contains the results of comparative trials using known additives.

It can be seen from Table I that the solutions to which compounds of formula I, or reaction products containing compounds of formula I had been added, retained a greater proportion of the starting calcium ion content in solution at 90 hours, than did the blank solution or than did the test solutions containing polymerised acrylic acid or known commercial products.

TABLE I

| | Additive | Additive Concentration p.p.m. | $Ca^{2+}$ remaining in solution after 90 hrs % |
|---|---|---|---|
| Example | Blank | Nil | 26 |
| Example 1 | Product from Example A | 10 5 | 100 |
| Example 2 | Product from Example B | 10 5 | 100 53 |
| Example 3 | Product from Example C | 10 5 | 81 39 |
| Example 4 | Product from Example D | 10 5 | 100 100 |
| Example 5 | Product from Example E | 10 5 | 100 68 |
| Example 6 | Product from Example F | 10 5 | 100 45 |
| Example 7 | Product from Example G | 10 5 | 71 42 |
| Example 8 | Product from Example H | 10 5 | 56.3 36.4 |
| Example 9 | Product from Example I | 10 5 | 52.6 37.1 |
| Example 10 | Product from Example J | 10 5 | 87.0 40.6 |
| Example 11 | Product from Example K | 10 5 | 92.7 49.2 |
| Comparative Examples | Polymerised acrylic acid. Product from Comparative Example C | 10 5 | 35 31 |
| | Sodium hexametaphosphate | 10 5 | 34 31 |
| | Sodium tripolyphosphate | 10 5 | 31 29 |
| | Hydroxymethane 1,1-diphosphonic acid | 10 | 28 |
| | Commercial polyacrylic acid molecular weight 10,000 | 10 5 | 50 31 |

EXAMPLES 12 to 18

An aqueous solution (1 ml) containing 1000 p.p.m. of one of the products from Example A, B, or G to K was mixed with an aqueous solution of $Ca(NO_3)_2.4H_2O$ (20g./l.;50 ml). An aqueous solution of $Na_2SO_4$ (17g/l.;50 ml) was added and the resulting solution heated to 90° over 10 minutes and the optical density of the solution continuously monitored and recorded using an Auto Analyser.

From the plot of optical density against time the initiation time and the rate of precipitation were determined. The initiation time is defined as the time after mixing the two solutions at which precipitation occurs (as judged by an increase in optical density), and the rate of precipitation is defined as the maximum positive slope of the plot of optical density against time. In the latter determination any rapid short-term increases from the base line of less than 15% of the optical density of the fully precipitated blank solution were disregarded.

It can be seen from Table II that the initiation time for $CaSO_4$ precipitation for compounds of formula I and the reaction products containing compounds of formula I is greater than the initiation times for the blank, polymerised acrylic acid and known commercial products. In addition the compounds of formula I and the reaction products containing compounds of formula I, have the advantage of affording lower rates of precipitation of $CaSO_4$ compared with the blank and the other Examples in Table II.

TABLE II

| Example | Additive | Additive concentration p.p.m. | Initiation Time Minutes | Rate of precipitation | % Precipitation 15 min | 30 min |
|---|---|---|---|---|---|---|
| | Blank | Nil | 3 | >30 | 100 | — |
| Example 12 | Product from Example A | 10 | 13 | 11 | 10 | 100 |
| Example 13 | Product from Example B | 10 | 12 | 6 | 15 | 100 |
| Example 14 | Product from Example G | 10 | 13 | 5.5 | 6 | 100 |
| Example 15 | Product from Example H | 10 | 8 | 1.2 | 8 | 100 |
| Example 16 | Product from Example I | 10 | 8.5 | 2.6 | 15 | 100 |
| Example 17 | Product from Example J | 10 | 10 | 0.9 | 6 | 100 |
| Example | Product from Example K | 10 | 12 | 2.3 | 9 | 100 |
| | Polymerised acrylic acid | 10 | 8 | >30 | 100 | — |
| | Product from Comparative Example C | | | | | |
| Comparative Examples | Sodium tripolyphosphate | 10 | 5 | >30 | 100 | — |
| | Hydroxymethane 1,1-diphosphonic acid | 10 | 3 | >30 | 100 | — |
| | Commercial polyacrylic acid Molecular weight 10,000 | 10 | 8 | >30 | 100 | — |

EXAMPLES 19 to 21

An aqueous solution (2 ml) containing 1000 ppm of one of the products from Examples D-F was mixed with an aqueous solution of $Ca(NO_3)_2.4H_2O$ (1.47g/l.; 100 ml). An aqueous solution of $Na_2CO_3$ (0.646g/l.;100 ml) was added and the resulting solution heated to 95° over 7 minutes, and the optical density of the solution continuously monitored and recorded using an Auto Analyser. The initiation time and rate of precipitation were determined in a manner similar to that described in Examples 13 to 20.

It can be seen from Table III that the initiation time for $CaCO_3$ precipitation for compounds of formula I and reaction products containing compounds of formula I are greater than those for the blank, polymerised acrylic acid and known commercial products. In addition the compounds of formula I and the reaction products containing compounds of formula I, have the advantage of affording lower rates of precipitation of $CaCO_3$ compared with the blank and the other Examples in Table III.

TABLE III

| Example | Additive | Additive concentration (p.p.m.) | Initiation Time (minutes) | % Precipitation 15 min | 30 min | 45 min |
|---|---|---|---|---|---|---|
| | Blank | nil | 1 | 100 | — | — |
| Example 19 | Product from Example D | 10 | 8 | 20 | 100 | — |
| Example 20 | Product from Example E | 10 | 7 | 20 | 36 | 100 |
| Example 21 | Product from Example F | 10 | 7 | 32 | 64 | 100 |
| Comparative Examples | Sodium tripolyphosphate | 10 | 2 | 100 | — | — |
| | Hydroxy methane 1,1-diphosphonic acid. | 10 | 3 | 100 | — | — |
| | Commercial polyacrylic acid Molecular weight 10,000 | 10 | 1 | 98 | 100 | — |
| | Polymerised acrylic acid Product from Comparative Example C | 10 | 2 | 80 | 100 | — |

EXAMPLE 22

Solutions of $Mg(NO_3)_2.6H_2O$ (6.5g/l;2l) and $NaHCO_3$ (4.0 g/l.; 2l) were prepared. The product from Example A was added to the solution of magnesium nitrate in an amount that attained the required test concentration.

The solutions were mixed and a sample (2l.) withdrawn for testing. The remaining solution was retained for addition to the test solution during the experiment.

A weighed mild steel sheath containing a 1KW cartridge heater was immersed in the 2 liter sample of solution causing boiling at the metal surface. The bulk of the test solution was maintained below its boiling point using a copper cooling coil.

The experiment was continued for 5 hours and during this time the remaining test solution was added. At the end of the experiment the test solution had been concentrated 1.7 times.

After the 5 hour experiment period, the concentration of magnesium ions in the solution, the weight of scale on the heater sheath, and the scale thickness were determined.

The results in Table IV demonstrate the efficiency with which the compounds of formula I inhibit the precipitation of $Mg(OH)_2$ from aqueous solutions. The concentration of magnesium ions in the final solution are higher, and the weight and thickness of the scale on the sheath are lower, from the test solution containing the compound of formula I than the respective values obtained from both the blank run and the test run on commercial polyacrylic acid.

TABLE IV

| | Additive | Additive concentration p.p.m. | Weight of Scale g. | Thickness of Scale Inch $\times 10^{-3}$ | $Mg^{++}$ concentration in the final solution p.p.m. |
|---|---|---|---|---|---|
| Example | Blank | nil | 2.1 | 20 | 150 |
| Example 22 | Product of Example A | 10 | 0.75 | 4 – 5 | 374 |
| Comparative Example | Commercial polyacrylic acid. Molecular Weight 10,000 | 10 | 1.8 | 11 – 15 | 196 |

The results in Tables I, II, III and IV clearly demonstrate the good stability imparted to aqueous solutions of calcium sulphate, calcium carbonate, and magnesium hydroxide by the compounds of formula I and by reaction products containing compounds of formula I.

We claim:

1. A method of inhibiting the precipitation of the scale forming salts of calcium, magnesium, barium and strontium from aqueous systems comprising adding to the aqueous system a scale inhibiting amount in the range of 1–200 ppm of a product comprising a telomeric compound of the formula:

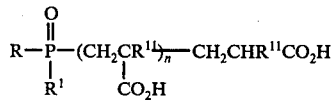

or salts thereof, wherein $R^{11}$ is hydrogen or a methyl or ethyl residue and $n$ is a positive integer of at most 100, R is a residue —OX wherein X is a straight or branched alkyl residue having from 1 to 4 carbon atoms, and $R^1$ is a residue —OX wherein X has its previous significance.

2. The method of claim 1 wherein $R^{11}$ is hydrogen.

3. The method of claim 1 wherein $n$ is an integer less than 60.

4. The method of claim 1 wherein $R^{11}$ is hydrogen and is an integer within the range of from 5 to 30.

5. The method of claim 1 wherein there is used a proportion of the inhibitor composition within the range of from 2 to 20 parts per million.

6. The method of claim 1, wherein the inhibitor product is used in conjunction with an effective amount of a dispersing or threshold agent selected from the group consisting of polymerized acrylic acid and its salts, hydrolyzed polyacrylonitrile, polymerized methacrylic acid and its salts, polyacrylamide and co-polymers thereof from acrylic and methacrylic acids, lignin sulphonic acid and its salts, tannin, naphthalene sulphonic acid/formaldehyde condensation products, starch and its derivatives, and cellulose; an effective amount of a precipitating agent selected from the group consisting of alkali metal orthophosphates, alkali metal sulphites and alkali metal hydroxides; an oxygen scavenger selected from the group consisting of alkali metal sulphites and hydrazine; a sequestering agent selected from the group consisting of nitrilotriacetic acid and its salts, an ethylene diamine tetraacetic acid and salts thereof; a corrosion inhibitor selected from the group consisting of cyclohexylamine, morpholine, distearylamine/ethylene oxide condensation products and stearylamine and antifoaming agents selected from the group consisting of distearyl sebacamide, distearyl adipamide and ethylene oxide condensates thereof, fatty alcohols and ethylene oxide condensates thereof.

* * * * *